Nov. 16, 1965     S. A. CORREN     3,218,195

ELECTRICITY GENERATING CELL

Filed Aug. 27, 1964

INVENTOR

Sidney A. Corren

BY *Lawrence I. Field*

ATTORNEY

United States Patent Office 3,218,195
Patented Nov. 16, 1965

3,218,195
ELECTRICITY GENERATING CELL
Sidney A. Corren, 163 Cherry St., Katonah, N.Y.
Filed Aug. 27, 1964, Ser. No. 392,405
11 Claims. (Cl. 136—86)

This application is a continuation-in-part of copending application, Ser. No. 84,535 filed Jan. 24, 1960.

This invention relates to methods and apparatus for producing electricity either intermittently, upon demand, or continuously, and it relates particularly to systems wherein the electricity is produced as a result of chemical reactions effected at electrodes.

Systems wherein a fossil fuel is caused to combine with oxygen in an electrochemical reaction producing electricity constitute "fuel cells" in the classical sense. Present day usage has extended the term to encompass not only electric generating systems in which carbon is caused to combine with oxygen but also systems in which hydrogen is caused to combine with oxygen or even any cell in which electricity is produced by an oxidation reduction reaction in which the oxidant is continuously supplied at one electrode while the reductant is supplied at another electrode and the resultant products are continuously removed from the cell.

One object of this invention is to provide a fuel cell which is capable of automatic attention-free operation for long periods and which is characterized by a simplicity of construction, high output and relatively long life with no danger of escaping inflammable or explosive gasses.

Another object is to provide a fuel cell which is simple in construction and which operates silently, at low temperatures and at atmospheric pressure and with essentially no heat evolution and no danger of explosion.

A particular object is to provide an anode electrode system which is particularly advantageous for use in battery cells with various counter-electrodes.

A general object of this invention is to provide an aluminum containing anode which is stable in a battery cell system at rest but capable of reaction when demand is put upon the cell.

Figure 1:
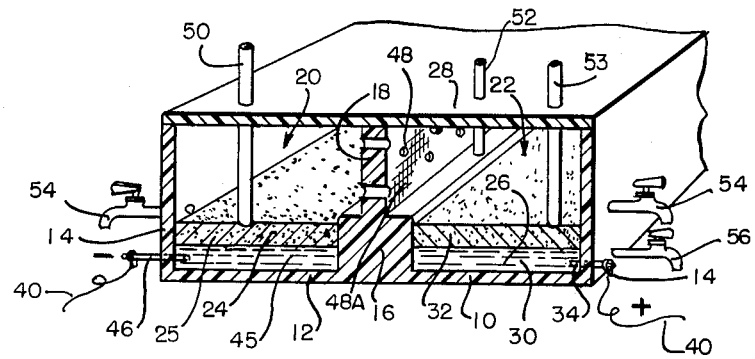
Figure 2:
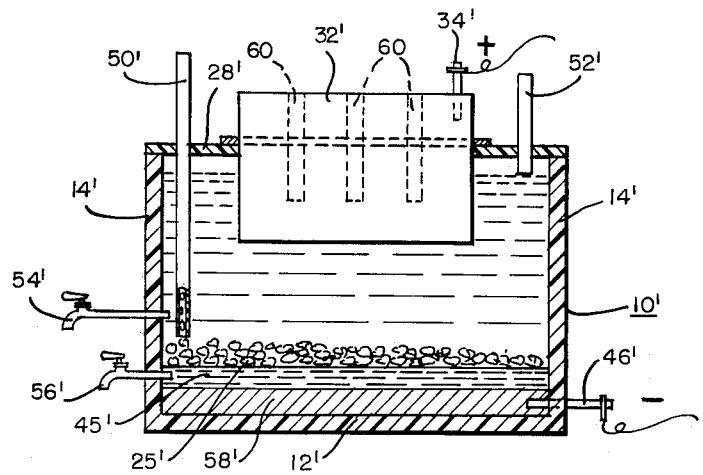

These and other objects are achieved by the battery cell of the present invention, preferred species of which are described in the description which follows and in the accompanying drawings in which the several figures are schematic representations of two types of fuel cells which have been operated according to the invention and in which FIGURE 1 is a view, partly in section showing one form of fuel cell according to the invention;

FIGURE 2 is a view of a modified cell in which a porous carbon air electrode is utilized.

In general the essential elements of the fuel cells shown in the drawings comprise:

(1) An anode;
(2) A cathode;
(3) An electrolyte;
(4) Means for feeding the reactants into the cell and for removing the products of the reaction from the cell; and
(5) Various auxiliary means to facilitate operation of the cell.

In the embodiment shown schematically in section in FIGURE 1, the cell consists of a vessel 10 formed of plastic, glass or other suitably inert electrically insulating material, polymethylmethacrylate being one such suitable material. Vessel 10 comprises a base 12 and upstanding side walls 14. Extending transversely across the base and rising upwardly from the base is a rib or ridge 16 on which a baffle 18 is supported, so as to divide vessel 10 into two compartments: an anode compartment 20 and a cathode compartment 22. While the anode and cathode compartments are shown roughly equal in size, their relative dimensions may vary considerably in practice. A well 24 formed between rib 16 and the sidewalls of the vessel constitutes a receptacle for confining a liquid anode. A similar well 26 is provided in the cathode compartment to receive a liquid cathode. Preferably vessel 10 is provided with a cover 28.

In the cell shown, the anode consists preferably of a layer 25 of particles of intermetallic compounds of aluminum more specifically described hereinafter, said particles being at least superficially amalgamated and floating on a pool of mercury 45 which serves to electrically connect the particles with an electrically conductive bar 46 which may be made of graphite or of a metal not soluble in mercury. Conductive bar 46 may be sealed into and extend both inward and outward from the base 12 or sidewall 14 (as shown) of the vessel in such a position that its inward extension lies within mercury pool 45. Alternatively bar 46 may extend downward through cover 28 extending through the electrolyte substantially filling anode compartment 20 and particularly layer 25 and terminating in mercury pool 45. When inserted in this fashion, it is preferable that bar 46 be protected by an insulator sheath such as a glass tube from which electrolyte is sealed. Bar 46 serves as the external anode connection for the cell. The cell reaction will result in the release of mercury from amalgamated anode material as the latter is used up. This excess mercury may be drawn off through a convenient drain in the bottom of the vessel and may be reused.

In the cell shown in FIGURE 1, the cathode is preferably generally similar in construction to the anode except that the cathode consists of a body of mercury 30 on which there floats a thin layer 32 of a mixture consisting of powdered carbon such as graphite or acetylene black and a metallic oxide such as HgO, PbO or $MnO_2$. The thickness of layers 30 and 32 has been exaggerated for purposes of illustration in FIGURE 1. An electrically conductive member 34 is secured through any wall of the cathode compartment so as to remain in contact with the liquid cathode. Member 34 is analogous in structure to bar 46. Members 34 and 46 are connected to electrical leads shown schematically at 40.

The physical barrier 18 which extends the electrode compartment separator the full height of the cell is not essential to the operation of the cell, but is desirable in that it prevents transfer of active electrode material from one electrode compartment to the other, especially if the cell is moved. Barrier 18 is preferably a sheet of the same synthetic plastic as that used for the vessel 10 and is provided with large perforations 48 so that electrolyte and ions can flow freely between the anode and cathode compartments.

Barrier 18 is preferably covered with a woven cloth 48A of nylon or other standard battery separator materials whose pores are sufficiently small to prevent the passage of solid particles between the anode and cathode compartments.

It should be noted that barrier 18 is not essential, pelleting (described below) being preferred as the means to avoid the loss in efficiency which occurs when portions of the cathode (layer 32) transfer to the anode side as a result of turbulence. Barrier 18 is an added precaution to minimize material transfer between compartments 20 and 22.

Operation of the cell has been found to be improved by mixing the carbon and mercuric oxide, pelleting the mixture and then charging the pellets into the cathode compartment 22. By this means the carbon or oxide do not clog the pores or pass through them and into the anode compartment.

A desirable anode material would be aluminum because its reaction can potentially release a comparatively large number of watt hours per pound of aluminum. However, because of its relatively high chemical activity, it is virtually impossible to use it in a cell in contact with an aqueous solution and especially not in contact with an alkaline solution. Pure aluminum will react with water to yield hydrogen except when it is covered with a protective layer of oxide in which case it becomes unreactive for all purposes. When it is used in the form of an amalgam it is still extremely reactive and will generate hydrogen even when in contact with distilled water.

Various alloys have been tried but all of them react with the usual electrolytes to a greater or lesser degree. Inhibitors in the electrolyte may slow down the reaction but do not prevent it. They usually form protective coatings on the aluminum which cause the cell to respond slowly to a demand for current.

In contradistinction I have found that certain combinations of iron and aluminum prepared by melting together the component metals and crushing the cooled product behave like metals lower in the electromotive series than aluminum. They do not react with the electrolyte of this invention to generate appreciable amounts of hydrogen and therefore large excesses of material can be maintained in the system. The system can therefore be operated for long periods without movement or sound from auxiliary equipment and a reservoir of fuel to respond to surges of power demand can be maintained. The cell can stand with the anode material in contact with caustic or other suitable electrolyte with substantially no reaction when no current is being drawn from the cell but reaction will start and current will be generated as soon as a load is put upon the cell.

The preferred compositions correspond to compounds which appear on the phase diagram for iron and aluminum and it is presumed that the materials actually occur in the form of indicated compounds such as $FeAl_2$. Mixtures of the compounds are similarly useable. The compound $FeAl_2$ corresponding to a melt containing 51% Fe and 49% Al has been found to be particularly advantageous. It has a desirably high aluminum content. Possessing the above described advantages of anode stability in contact with electrolyte. Cells using partially amalgamated $FeAl_2$ can be run intermittently and with varying electrical output independent of the feed rate of anode material, provided only that sufficient material is present to support the reaction. The $FeAl_2$ has the further advantage that its particles can be readily partially amalgamated and that they will then float on the surface of the liquid mercury as a porous mass with a large active anode area. The particles do not completely dissolve in the mercury in which event the anode area would be reduced to the area of the geometric plane. The area available for anode reaction and the maximum output rate of the cell would be therefore materially reduced.

The above advantages are in apparent distinction from various other aluminum alloys, usually without involvement of any major part of the aluminum in compound formation, which are reactive with alkaline electrolytes.

For purposes of illustration, one manner of using $FeAl_2$ as the anode material will now be described in some detail.

Since $FeAl_2$ contains only 49% Al, the 50–50 alloy purchased as an article of commerce, actually contains a slight excess of aluminum. The $FeAl_2$ was ground to about 60 mesh (Tyler standard) particle size by conventional apparatus. A pool of mercury was charged into a clean glass beaker and a thin layer of a 25% aqueous solution of NaOH was poured onto the pool of mercury. The particles of $FeAl_2$ were dropped into the layer of aqueous caustic and any superficial oxide present on the particles was removed by the contact with the caustic as the solid particles of the intermetallic compound settled by gravity into the pool of mercury. The particles were then mixed vigorously with the pool of mercury. The particles were at least superficially amalgamated by the mercury to form a slightly adherent mass which floated on the excess mercury. The floating mass was removed and was then fed into tube 50 extending onto the layer of mercury in well 24 of the cell shown in FIGURE 1, wherein it constituted the replenishment of the intermetallic anode material. In the cell the pasty amalgam floats on the mercury in well 24. It is also possible but not preferred to form the pasty layer directly on a pool of mercury present in the cell, by adding intermetallic material from time to time as needed.

With the system $FeAl_2$, Hg/NaOH, $H_2O$/HgO, C, Hg a cell similar to that shown in FIGURE 1 was run for 15 months through a load of 51.7 ohms at 0.96 volt output, producing 177 watt hours.

The relative size of compartments 20 and 22 should be such that each electrode operates at its maximum current density. This will depend to some extent on the shape, size and composition of the electrode particles.

Suitable means shown schematically as tubes 50 and 53 extend into vessel 10 for replenishing the $FeAl_2$ and mercuric oxide from time to time, as they are consumed, and also outlets 54, 56 for removing the spent electrolyte and mercury and graphite formed as a result of cell operation. Inlet 52 is used for replenishing the electrolyte.

In the system of this example, the iron remained as a residue of fine powder suspended in the electrolyte which was removed readily with the waste electrolyte through suitable outlets.

Electrolyte: A 25% sodium hydroxide solution was used but any equivalent alkaline solution might have been used. The concentration is not critical. What is essential is a relatively strong source of alkali metal and hydroxyl ions. Potassium hydroxide and sodium carbonate are useable alternatives. For ease of continuous operation, the waste electrolyte containing sodium aluminate was drawn off and replaced with fresh electrolyte. It is possible however by control of the pH to precipitate the aluminum as the hydrate and regenerate the sodium hydroxide.

Cathode: The cathode of this equipment was made by mixing mercuric oxide powder as purchased from Fisher Scientific Company with 10% powdered graphite and compacting into pellets. The pellets made a very convenient cathode when floated on a bed of mercury. The system is not dependent upon using this material as cathode but will operate effectively with other depolarizers or fuel cell cathodes such as lead oxide, silver oxide and air or oxygen porous electrodes. With an oxygen electrode the reaction appears to be $$2FeAl_2 + 3O_2 + 4NaOH = 4NaAlO_2 + 2Fe + 2H_2O$$

The open circuit voltage of this system is 1.1 volts. It was maintained on continuous operation for 3 years discharging through 52 ohms with an operating voltage between 0.9 and 1.0 volt. Operation was very simple because excess ingredients could be added. Thus from time to time $FeAl_2$ 25% NaOH electrolyte and HgO, C pellets were added. Waste electrolyte with fine iron powder and mercury were drawn off.

For example during another twenty month period the cell was discharged through a load of 50 ohms at an average of 0.96 volt. Fed in were 1307 grams of 50% iron aluminum powder and 751 grams of the mercuric oxide-10% graphite mix. 25% sodium hydroxide was fed in at an approximate rate of 75 cc. per day. This cell ran with no attention over weekends and holidays.

FIGURE 2 illustrates a cell utilizing the same anode materials and electrolyte as those used with the cell of FIGURE 1, except that the cathode is a porous carbon electrode.

The cell shown in FIGURE 2 comprises a vessel 10′ having a base 12′, sidewalls 14′ and a cover 28′ all of polymethylmethacrylate or other suitable chemically inert material.

Resting on the bottom 12' is a graphite slab 58 electrically connected to bar 46' through the wall of vessel 10'. A pool of mercury 45' rests on the slab and supports a layer of superficially amalgamated particles of intermetallic compound 25'.

Supported by cover 28' is an air cathode 32' which is a massive piece of porous carbon having a plurality of dead ended holes 60 bored into its upper outer surface, external of the cell. The holes are provided for the purpose of increasing the area through which atmospheric $O_2$ or air can diffuse to the active electrode surface. This type of electrode is well known, per se, being described in Vinal's text "Primary Batteries" on pages 217 and 218 and is commercially available in various sizes and shapes.

The cover also supports conduit means 50' and 52' for the admission of fresh particles of amalgamated metal and fresh electrolyte respectively.

A terminal 34' affords an electrical connection to the air cathode.

Outlets 54' and 56' are provided for the removal of waste electrolyte and the suspended iron particles therein and for the removal of excess mercury, so as to avoid an undesirable increase in the size of the pool of mercury.

The remainder of vessel 10 contains a suitable alkaline electrolyte of the kind previously described.

In one test utilizing the cell of FIGURE 2 with an anode consisting of particles of $FeAl_2$ between 1/8 inch and 20 mesh, superficially amalgamated, the following operating voltages were obtained:

| Load: | Volts |
|---|---|
| Open circuit | 1.10 |
| 43 ohms | 1.00 |
| 23.1 | 0.96 |
| 10.3 | 0.92 |
| 5.0 | 0.84 |
| 1.1 | 0.59 |

I claim:

1. In an electricity generating cell wherein an oxidizable condensed phase anode material and a reducible cathode material react in an oxidation-reduction reaction with consequent production of electricity, the improvement which comprises providing as the principal constituent of the oxidizable condensed phase anode material, superficially amalgamated particles of an intermetallic compound of aluminum and iron represented by the formula $FeAl_2$.

2. The electricity generating cell of claim 1 wherein the oxidizable anode material consists of superficially amalgamated particles of $FeAl_2$.

3. The fuel cell of claim 1 wherein the reducible cathode material is a mixture of powdered carbonaceous material and a reducible metal oxide.

4. The electricity generating cell of claim 3 wherein the powdered carbonaceous material and metal oxide comprising the reducible cathode material is in the form of pellets of a mixture of the oxide and carbonaceous material.

5. The electricity generating cell of claim 3 wherein the metal oxide is selected from the group consisting of $HgO$, $PbO$ and $MnO_2$.

6. The electricity generating cell of claim 2 wherein the reducible cathode material is a mixture of powdered carbonaceous material and a reducible metal oxide.

7. The electricity generating cell of claim 6 wherein the metal oxide is selected from the group consisting of $HgO$, $PbO$ and $MnO_2$.

8. The battery cell of claim 1 wherein the cell includes at least one porous carbon cathode through which air may be introduced into the cell to supply the reducible cathode material.

9. The battery cell of claim 2 wherein the cell includes at least one porous carbon cathode through which air may be introduced into the cell to supply the reducible cathode material.

10. A fuel cell comprising a vessel formed of material which is electrically insulating and which is chemically inert towards the content of the vessel; means including liquid mercury for effecting the introduction into said vessel of an oxidizable condensed phase anode material consisting of superficially amalgamated solid particles of intermetallic compounds of aluminum and iron; and means including liquid mercury for introducing a reducible cathode material consisting of powdered carbonaceous material and a reducible metal oxide into said vessel; barrier means for confining the anode material within the confines of an anode region in said vessel and in electrical contact with an anode electrode and for confining the cathode material within the confines of a cathode region in said vessel and in electrical contact with a cathode electrode; means for maintaining the volume remaining in said vessel, in addition to that occupied by the anode and cathode materials, substantially filled with an aqueous electrolyte electrically connecting said anode and said cathode; means for withdrawing from said vessel, the products of an electrochemical reaction wherein the anode material is oxidized and the cathode material is reduced in said vessel; and leads electrically connected to said anode and said cathode whereby the electrical output of said cell may be recovered and utilized.

11. A fuel cell comprising a vessel formed of material which is electrically insulating and which is chemically inert towards the content of the vessel; means including liquid mercury for effecting the introduction into said vessel of an oxidizable condensed phase anode material consisting of superficially amalgamated solid particles of intermetallic compounds of aluminum and iron; barrier means for confining the anode material within the confines of an anode region in said vessel and in electrical contact with an anode electrode; at least one porous carbon cathode serving as means for introducing air into the cell to supply reducible cathode material; means for maintaining the volume remaining in said vessel, in addition to that occupied by the anode and cathode materials, substantially filled with an aqueous electrolyte electrically connecting said anode and said cathode; means for withdrawing from said vessel, the products of an electrochemical reaction wherein the anode material is oxidized and the cathode material is reduced in said vessel; and leads electrically connected to said anode and said cathode whereby the electrical output of said cell may be recovered and utilized.

References Cited by the Examiner

UNITED STATES PATENTS

| 553,719 | 1/1896 | Olan | 136—83 |
| 2,275,281 | 3/1942 | Berl | 136—86.2 |
| 2,542,575 | 2/1951 | Ruben | 136—107 |
| 2,646,458 | 7/1953 | Walz | 136—100 |
| 3,057,946 | 10/1962 | Eidensohn | 136—86 |
| 3,107,184 | 10/1963 | Gilbert | 136—86 |

WINSTON A. DOUGLAS, *Primary Examiner.*

JOHN H. MACK, *Examiner.*